Patented Jan. 8, 1935

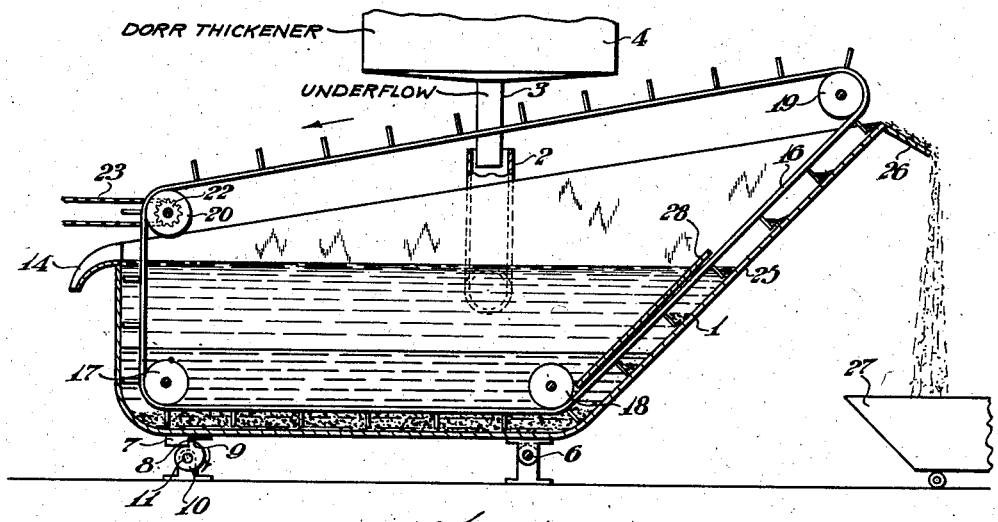

1,986,897

UNITED STATES PATENT OFFICE 1,986,897

DEWATERING COAL SLUDGE

Joseph A. Shaw, Pittsburgh, Pa., assignor to The Koppers Company of Delaware, a corporation of Delaware Application June 30, 1931, Serial No. 547,900

2 Claims. (Cl. 210—55)

This invention relates to de-watering sludge, and more particularly to such treatment as applied to sludge of such character that the solids will not satisfactorily separate out therefrom by gravity, even after standing for long periods of time.

While the invention is of general application for the de-watering of various sludges, it is of particular importance in connection with the dewatering of sludge produced in the wet washing of coal.

According to one of such coal washing processes the coal is separated into various sizes for the washing, and the water from the steps of washing the various sizes of coal is conducted to a common sump. The smaller sizes of coal take up a considerable quantity of water, and these smaller sizes are therefore passed through a centrifugal machine, such as the Carpenter drier. The effluent from the Carpenter drier is returned to the common sump.

The effluent from this tank is subjected to a gravity separation of the water and the coal sludge. This is generally effected by passing the effluent through a Dorr thickener. In the washing process, the water and coal are subjected to various screening operations, with the result that the solids in the coal sludge from the underflow of the Dorr thickener are so small that they will pass through a 48 mesh screen, and often much of these solids will pass a 200 mesh screen. The action of the Dorr thickener is such that the consistency of the coal sludge in the underflow contains from 35% to 55% solids of the size mentioned above.

It will be appreciated that in a large coal washing plant, enormous quantities of water must be circulated. Hence, a very large quantity of coal sludge is produced. At certain plants, the production is about 350 to 450 gallons per minute, or from 35 to 45 tons per hour. In fact, in washing 10,000 tons of coal, 500 tons leave the plant in the form of sludge through the Dorr underflow. This coal, if dewatered is a good marketable coal, which, depending upon market conditions would be worth sometimes as much as $1.00 per ton, the finely divided condition being the chief factor in lowering the value. At the present time, most of this sludge is pumped to the dump, representing a loss of from $500.00 to $1000.00 per day.

There is a characteristic phenomenon about fine particles of coal or solids such as will pass through a 48 mesh screen, and a varying percentage of which will pass a 200 mesh screen. Where the percentage of solids is small, as in the effluent from the coal washing, the sludge may be settled out by mere standing, which is accelerated by the Dorr thickener, so that water of sufficient clarity for return to the washing may overflow therefrom.

However, the Dorr thickener underflow produces a sludge containing 35% to 55% solids. With this percentage, further settling has been heretofore very difficult. Whether or not a mechanical suspension is the real cause of this condition is not known, but may be so considered for the purposes of this specification. Sludge of this percentage of solids is a very dark gray or black pasty substance of about the consistency of thick cream, from which solids and water will not satisfactorily separate out upon long periods of standing.

Although various expedients have been attempted for separating the solids and water from this sludge, such as flotation, filtering and the like, these expedients have been unsatisfactory for various reasons, such as prohibitive expense in installation and operation.

It is therefore an object of the present invention to provide a simple and economical process for the dewatering of sludge.

Another object is to provide a mechanical process for the dewatering of sludge in large quantities.

Other objects and features of novelty will be apparent as the following description proceeds, reference being had to the accompanying drawing, in which Figure 1 is a vertical section showing apparatus whereby the process according to the preferred form of the present invention may be practiced; and Fig. 2 is a similar view of modified apparatus.

Referring more particularly to the drawing, the apparatus shown in Fig. 1 comprises a tank 1, provided with an inlet pipe 2, to which sludge is supplied by the underflow 3 from a Dorr thickener indicated generally at 4.

One end of the tank 1 is supported by a pivot 6, while the other end of the tank 1 is provided with a plate 7, which is supported upon an eccentric device. In the form shown, the plate 7 is provided with a shoulder 8 adapted to cooperate with a corresponding shoulder 9 formed in a cam 10. This eccentric device is keyed to a shaft 11 which is driven by any desired mechanism from an external source of power.

It will be obvious that rotation of the shaft 11 in the direction of the arrow shown will cause the shoulder 9 to engage the plate 7 and raise it to the height of the shoulder 9. After the shoulder 9 passes by the shoulder 8, the weight of the tank and the contained sludge cause it to descend very sharply, thus resulting in a jar or impact on the tank, which jar is transmitted to the body of the sludge therein. However, it is to be understood that other forms of eccentric may be substituted for the shoulder 9, and that the shoulder 8 may be omitted in some instances.

The amplitude of the eccentric device may be varied, and is preferably kept quite small, so as to avoid agitation of the body of sludge. It is desirable to cause a jar or jolt to the mass of sludge in the container 1, but of course it is undesirable to cause sufficient agitation to result in a mixture or stirring of the sludge which would defeat the purposes of the process.

In fact, desirable results may be obtained by supporting the tank 1 fairly rigidly, and applying the eccentric device or other device to supply hammer blows to a portion of the tank which may act as a diaphragm. The hammer blow mentioned above, or the impulses, waves or other forms of vibration set up in the body of the sludge may be harmonic, but the invention is not limited to this form.

The shaft 11 is preferably rotated at fairly high speed, it being desirable to have the frequency of the jars increased to a maximum, although excessive speeds should be avoided which would result in the shoulder 9 maintaining the plate 7 in an elevated position, without opportunity for the action of gravity to cause the plate 7 to descend.

The jar or impact caused by the action of the shoulder 9 is transmitted to the body of sludge within the container 1, and this vibration serves to break down the suspension of the fine coal particles in the sludge, and permit such particles to settle out by gravity and accumulate in the lower portion of the tank.

As the sludge is continuously introduced through the pipe 2, and as the solids are continuously settled out by virtue of the vibration, the supernatant liquid is continuously discharged through an overflow pipe 14. For the removal of the dewatered sludge, a conveyor is provided which comprises a chain or belt 16 passing over pulleys or rollers 17 and 18 mounted on shafts at the lower corners of the tank 1. The corners of the tank are preferably rounded to conform to the curvature of the path of the outer edge of the flights of the conveyor, when this construction is employed, so that fairly close contact of the flights and the wall of the container may be preserved.

The conveyor chain or belt 16 passes over a pulley 19 located well above the level of the sludge in the tank, and also passes over a driving pulley 20 at the opposite upper end of the tank. The pulleys 19 and 20 are mounted on shafts suitably journalled in the walls of the tank 1. The pulley 20 is a drive pulley and the shaft thereof is suitably driven as by means of a sprocket 22 keyed to the shaft thereof and driven by a chain 23, in turn receiving power from any desired source.

The conveyor is driven in the direction of the arrow and serves to collect the solids which have been deposited upon the bottom of the tank 1. The wall at the discharge end of the tank 1 is preferably inclined as shown at 25, the pulleys 18 and 19 being arranged to cause the flight conveyor to conform thereto. Thus the conveyor moves the coal solids up the incline 25 and discharges the same through a chute 26 into a car 27.

Where a belt is used in lieu of the chain or flight conveyor, suitable pulleys are provided for guiding the belt, and suitable scrapers are provided for removing the material deposited thereon. In this case it may be preferable to return the belt under the tank rather than over it.

In either case, to prevent the separated material from being taken up by the supernatant water, a baffle 28 is provided, which extends from side to side of the tank 1, and encloses a delivery portion of the conveyor. This arrangement preserves the separation of solids from the liquid and prevents re-suspension thereof.

While the construction and operation described above constitutes the preferred embodiment of the present invention, the same is susceptible to many modifications, one of which may be described in connection with Fig. 1. For this operation the shaft 11 is not driven, and the container 1 remains stationary. The conveyor chain or belt 16 is driven by means of the sprocket 22 and chain 23 from a source of rapid intermittent or oscillating drive. Thus, the conveyor is advanced with a very rapid oscillating or step-by-step movement through the body of sludge in the tank 1.

This step-by-step movement results in a certain vibration of the body of sludge in the tank 1, and tends to set up a wave motion therein. This action serves to break up the suspension of the solids in the sludge and permits the solids to be recovered through the chute 26 and car 27 as described in connection with the preferred embodiment.

A further modification of the invention is illustrated in Fig. 2. In this view the Dorr thickener is indicated at 4, the same being identical with that shown in Fig. 1. The underflow is designated at 30 and extends directly from the thickener to terminate below the level of the sludge in the tank 31.

The tank 31 is stationary, and has pivotally mounted in suitable bearings on the inner walls thereof a plurality of transverse shafts 32. Each of these shafts carries a paddle 33 preferably extending for the full length of the tank with suitable clearance at the end. The shafts 32 project through the sides of the tank and have keyed thereto arms 34.

The arms 34 are all pivotally connected to a rod 36 connected to a scotch yoke 37 comprising a slot 38 and a pin 39 suitably driven by a shaft 40. Of course, the scotch yoke may be substituted by a source of jar action, and the paddles 33 may be mounted for rectilinear rather than oscillating motion.

In this modification, the shaft 40 is driven at a fairly high speed and the throw of the pin 39 and the lengths of the arms 34 are coordinated to produce a low amplitude for the torsional vibration of the shafts 32, which results in the paddles 33 having an oscillation about their pivots, of high frequency and low amplitude.

The action described above results in setting up a wave motion in the body of the sludge in the container 31, which wave motion breaks up the suspension and causes the solids to separate from the water. The supernatant liquid is decanted through the pipe 14 as described in connection with Fig. 1. For removing the settled solids, a screw conveyor 42 is suitably mounted in the bottom of the container 31 so as to distribute the accumulated solids laterally through a discharge spout 43.

By the practice of the invention according to the foregoing description, a large percentage, often more than 60% and frequently as much as 94% of the coal content of the sludge may be recovered. The percentage of solids in the recovered coal has been found to be as high as 74%, very readily more than 65%. The solids are recovered in a somewhat caked condition which will not flow, has a dry appearance and has marked differences in character from the sludge of the Dorr thickener underflow.

The recovered solids are such as may be profitably dried by various driers now on the market. Furthermore, the nuisance of disposal of large quantities of sludge is avoided, which alone may justify the expense of dewatering for some installations. This saving is in addition to the value of the marketable coal recovered from the sludge.

While several embodiments of the invention have been illustrated and described in such detail as to enable anyone skilled in the art to practice the invention, nevertheless it is to be understood that the invention is not to be limited to any of the details disclosed other than as necessitated by the development of the prior art. Instead it will be appreciated that the invention embraces such embodiments of the broad idea as fall within the scope of the appended claims, it being obvious that various alterations, modifications, adaptations and other changes may be resorted to without departing from the spirit of the invention.

I claim as my invention:

1. The process of treating water with which coal has been washed, for recovering coal content therefrom, which comprises: continuously subjecting the water to thickening or clarification by gravity and thereby preliminarily settling the coal in the form of a sludge therefrom, continually withdrawing said sludge during continuance of the thickening operation and subjecting a mass thereof to vibration and effecting thereby a gravity separation of coal from the sludge with supernatation of the water, and separately withdrawing the supernatant water and gravity separated coal continuously from the sludge during continuance of the vibration of incoming sludge from the thickening operation.

2. The process of treating effluent from a coal washing plant, which comprises passing the effluent to a Dorr thickener, wherein gravity separation of coal sludge is effected and clarified water overflow is returned to the washing plant, discharging into a container the coal sludge underflow containing 35% to 55% solids of which more than 80% will pass through a 48 mesh screen, continuously vibrating said container by subjecting the same to successive jars of high frequency and low amplitude, whereby gravity separation of the coal and water is effected, decanting the supernatant water, and withdrawing from the container a substantial portion of the coal content of the underflow from the Dorr thickener in the form of more than 65% solids.

JOSEPH A. SHAW.